G. H. WILSON.
DETACHABLE GEARING FOR TRACTION ENGINES.
APPLICATION FILED JAN. 16, 1914.
1,136,302.
Patented Apr. 20, 1915.
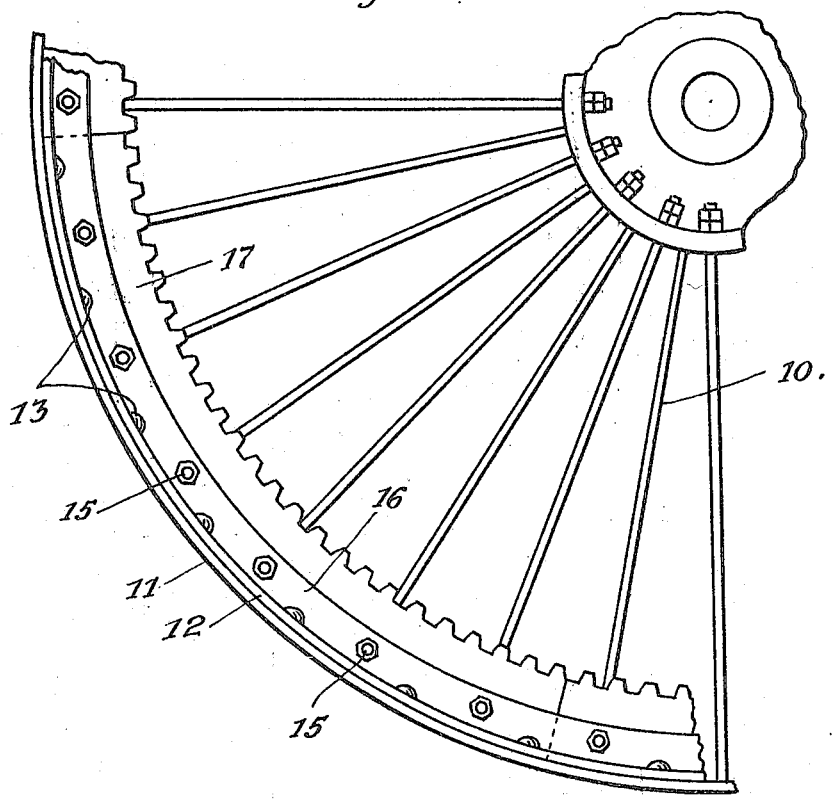
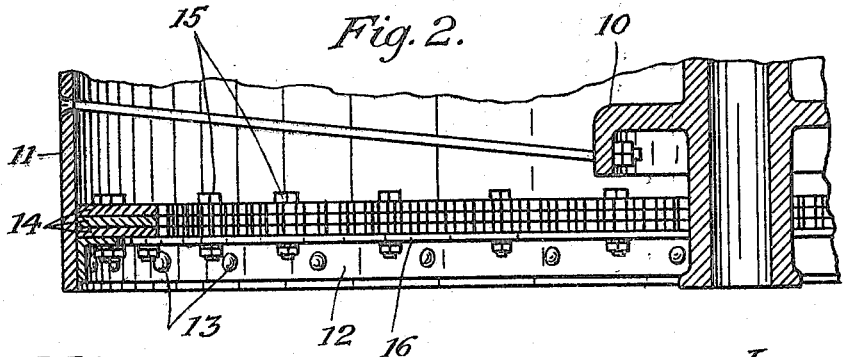
Witnesses:
Theo. Lagaard
H. A. Bowman
Inventor:
George H. Wilson.
By his Attorney.

UNITED STATES PATENT OFFICE.

GEORGE H. WILSON, OF MINNEAPOLIS, MINNESOTA.

DETACHABLE GEARING FOR TRACTION-ENGINES.

1,136,302. Specification of Letters Patent. Patented Apr. 20, 1915.

Application filed January 16, 1914. Serial No. 812,474.

*To all whom it may concern:*

Be it known that I, GEORGE H. WILSON, a citizen of the United States, residing at Minneapolis, in the county of Hennepin and State of Minnesota, have invented certain new and useful Improvements in Detachable Gearing for Traction-Engines, of which the following is a specification.

My invention relates to detachable gearing for traction engines, and has for its object to provide an internal gear which may be formed in sections and removably attached directly to the rim of the traction wheel.

It is the object of my invention to provide a simple and efficient means of securing such gear sections to the rim of the traction wheel to form the integral gear.

The full objects and advantages of my invention will appear in connection with the detailed description thereof and are particularly pointed out in the claims.

In the drawings, illustrating the application of my invention in one form,—Figure 1 is a side view of a portion of a traction wheel having my improved gearing applied thereto. Fig. 2 is a radial section of a portion of a traction wheel showing my sectional gearing attached thereto.

As illustrated, a traction wheel 10 of any desired construction has secured to the rim 11 thereof a piece of angle iron 12. This angle iron will preferably be attached by means of rivets 13 having their outer heads countersunk in the face of the tire, and the angle iron may advantageously be riveted to the inner surface of the tire adjacent an edge thereof. An interior gear, preferably formed of a series of superposed strips of sheet metal 14 is secured by means of bolts 15 passing through said gear strips directly to the radially extended flange 16 of the angle iron 12. The bolts 15 thus operate not only to hold the gear in position upon the tire of the traction wheel but also to hold the sections united. The strips 14 in any event will preferably be made sectional; that is, the strips will not be formed as integral rings covering the entire circumference of the circle formed by the gear, but will be formed as segments of such circle. If desired, in place of a composite gear formed of the plurality of strips 14, gear segments 17 may be employed, of a single thickness, either of wrought-iron or cast metal, as may seem desirable.

The advantages of my invention will be apparent. The power will be applied directly to the tire of the traction wheel, and no part of said power will need to be transmitted through the hub or spokes. The gearing is perfectly accessible, and when the same becomes worn or broken it may be replaced with the utmost facility without removing the traction wheel or dismounting any part of the machine. Furthermore, where sectional gearing is employed, a damaged or broken section may be removed without disturbing any other part of the gear.

I claim:

1. In combination with the wheel rim or tire of a traction wheel, an angle iron riveted to the inside of said wheel rim so as to have a flange extending radially toward the center of the wheel, and an internal gear bolted to said flange.

2. In combination with the wheel rim or tire of a traction wheel, an angle iron riveted to the inside of said wheel rim so as to have a flange extending radially toward the center of the wheel, and an internal gear bolted to said flange, said internal gear being formed in segmental sections.

3. In combination with the wheel rim or tire of a traction wheel, an angle iron riveted to the inside of said wheel rim so as to have a flange extending radially toward the center of the wheel, and an internal gear bolted to said flange, said internal gear being formed of a series of superposed plates, the bolts for holding said gear to the flange also serving to hold the plates united.

In testimony whereof I affix my signature in presence of two witnesses.

GEORGE H. WILSON.

Witnesses:
F. A. WHITELEY,
H. A. BOWMAN.

Copies of this patent may be obtained for five cents each, by addressing the "Commissioner of Patents, Washington, D. C."